United States Patent
Choi et al.

(10) Patent No.: US 9,398,198 B2
(45) Date of Patent: Jul. 19, 2016

(54) PIPE CRAWLER APPARATUS AND METHOD FOR INTERNAL PIPE INSPECTION

(71) Applicant: Siemens Energy, Inc., Orlando, FL (US)

(72) Inventors: Jae Young Choi, Murrysville, PA (US); Christopher Lee Harms, Mobile, AL (US); James A. Bauer, Gibsonia, PA (US); Scott A. Karstetter, Monroeville, PA (US); Michael R. Vindler, Pittsburgh, PA (US)

(73) Assignee: Siemens Energy, Inc., Orlando, FL (US)

( * ) Notice: Subject to any disclaimer, the term of this patent is extended or adjusted under 35 U.S.C. 154(b) by 209 days.

(21) Appl. No.: 14/186,009

(22) Filed: Feb. 21, 2014

(65) Prior Publication Data
US 2015/0240984 A1 Aug. 27, 2015

(51) Int. Cl.
H04N 7/18 (2006.01)
H04N 5/225 (2006.01)
F16L 55/32 (2006.01)
F16L 101/30 (2006.01)

(52) U.S. Cl.
CPC .............. *H04N 5/2251* (2013.01); *F16L 55/32* (2013.01); *H04N 7/185* (2013.01); *F16L 2101/30* (2013.01); *H04N 2005/2255* (2013.01)

(58) Field of Classification Search
None
See application file for complete search history.

(56) References Cited

U.S. PATENT DOCUMENTS

| | | | |
|---|---|---|---|
| 3,876,255 A | 4/1975 | Ilon | |
| 5,551,349 A | 9/1996 | Bodzin | |
| 2011/0190933 A1* | 8/2011 | Shein | B62D 55/075 700/258 |
| 2013/0140801 A1* | 6/2013 | Schlee | B62D 57/024 280/762 |
| 2013/0233064 A1* | 9/2013 | Ono | F01D 25/26 73/112.02 |
| 2013/0269426 A1* | 10/2013 | Remillard | F01D 5/005 73/112.01 |
| 2013/0328997 A1* | 12/2013 | Desai | H04N 7/141 348/14.02 |
| 2014/0204197 A1* | 7/2014 | Olsson | H04N 5/23203 348/84 |

* cited by examiner

Primary Examiner — Eileen Adams

(57) ABSTRACT

Steam turbine engine cross over pipe or other pipe internal inspection is performed with a selectively steerable pipe inspection crawler apparatus with a chassis having a longitudinal axis, with front and rear Mechanum wheels capable of independently-selected forward or rearward driven rotational direction, for selectively steering the apparatus within the pipe interior under control of a human-machine interface (HMI). The crawler apparatus has at least one inspection camera having a field of view, for capturing images of a pipe interior that is also under control of the HMI. Embodiments of the crawler apparatus include a selectively orientable inspection camera and/or a deployable bore scope that is selectively deployed and retracted from a descending section of the cross over pipe.

11 Claims, 6 Drawing Sheets

PIPE CRAWLER APPARATUS AND METHOD FOR INTERNAL PIPE INSPECTION

BACKGROUND OF THE INVENTION

1. Field of the Invention

The invention relates to selectively steerable and maneuverable crawler apparatus and methods for visually inspecting pipe interiors and capturing images thereof with cameras under control of a human-machine interface (HMI). More particularly the invention is directed to crawler apparatus and methods for visually inspecting steam turbine engine cross over pipe interiors, including weld fillets on the under and top sides of flow guides formed between transverse and descending sections in the pipe.

2. Description of the Prior Art

FIGS. 1 and 2 show a known steam turbine 20, including a cross over pipe 22 having an inlet port 23 within a transverse section 24 of the pipe that transition to a bend section 25 and a descending section 26. A flow guide 28 is interposed between the transverse 24 and descending 26 sections of the pipe 22 and is affixed to the pipe inner circumferential wall by weld fillets 29. During periodic engine 20 services, it is desired to inspect periodically pipe 22 interior circumferential wall, upper and lower surfaces of the flow guide 28 and its weld fillets 29 as well as turbine blades 30. Wheeled crawler vehicles employing cameras have been inserted in pipes to perform visual inspections of their interior circumferences. Traditional wheel vehicles have difficulties gaining sufficient traction to be maneuvered with the pipe interior. To overcome traction difficulties in pipe interiors U.S. Pat. No. 5,551,349 describes a pipe crawler vehicle that utilizes a pair of forward and rear Mechanum-type wheels (described in U.S. Pat. No. 3,876,255) having rotational axes parallel to the vehicle longitudinal axis. The vehicle maneuvers in a straight line by screw-like wheel motion, but does not appear to be selectively steerable within a pipe. A vehicle without steering capability would not be able to circumnavigate a pipe surface in order to crawl on the upper surface of a steam cross over pipe flow guide 28. Inspection bore scopes have also been inserted into turbine engine cross over pipes 22, but they are cumbersome to maneuver through the pipe transition to either the upper or the lower surfaces of the flow guide 28, or to descend down the descending section 26.

SUMMARY OF THE INVENTION

Steam turbine engine cross over pipe or other pipe internal inspection is performed with a selectively steerable pipe inspection crawler apparatus with a chassis having a longitudinal axis. The crawler apparatus has front and rear Mechanum wheels capable of independently-selected forward or rearward driven rotational direction, for selectively steering the apparatus within the pipe interior under control of a human-machine interface (HMI). The crawler apparatus has at least one inspection camera having a field of view, for capturing images of a pipe interior that is also under control of the HMI. Embodiments of the crawler apparatus include a selectively orientable inspection camera and/or a deployable bore scope that is selectively deployed and retracted from a descending section of the cross over pipe. Other embodiments include front and/or rear cameras coupled to the chassis for crawler maneuvering and/or capturing images within the pipe interior.

The crawler inspection system is useful for inspection of flow guides between transverse and descending sections within interiors of steam turbine engine cross over pipes, as well as for other types of pipe or conduits. Embodiments of the crawler inspection system are capable of maneuvering under or over flow guides under control of the human-machine interface (HMI). Other embodiments have deployable bore scopes that can be dropped down turbine engine cross over pipes descending sections to inspect descending walls and turbine blades, and thereafter retracted upon inspection completion.

Embodiments of the invention feature a selectively steerable pipe inspection crawler apparatus, comprising a chassis having a longitudinal axis; and at least one front and at least one rear respective Mechanum wheel capable of independently-selected driven forward or rearward rotational direction, for selectively steering the apparatus within a pipe interior. The crawler apparatus has at least one inspection camera having a field of view, for capturing images of the inspected pipe's interior.

Other embodiments of the invention feature a steam turbine engine cross over pipe inspection system, comprising a selectively steerable pipe inspection crawler apparatus, having a chassis having a longitudinal axis and pairs of front and rear independently-selected forward or rearward driven rotational direction Mechanum wheels that are respectively driven by a separate drive motor. A magnet or magnet array is coupled to the chassis, for magnetic coupling of the apparatus to a wall forming a pipe interior, in order to improve crawler apparatus traction and maneuverability within the pipe. The apparatus also has at least one inspection camera having a camera drive motor for selectively orienting the camera field of view, for capturing images of a pipe interior. A human-machine interface is coupled to the crawler apparatus, for controlling the Mechanum wheels and camera drive motors and camera image capture.

Additional embodiments of the invention feature methods for inspecting an interior of a steam turbine engine cross over pipe of the type having a transverse section, a descending section and a flow guide interposed in a transition between the transverse and descending sections, comprising providing a selectively steerable pipe inspection crawler apparatus, having a chassis having a longitudinal axis and at least one front and at least one rear respective Mechanum wheel capable of independently-selected forward or rearward driven rotational direction, for selectively steering the apparatus within a pipe interior. The inspection apparatus is also provided with at least one inspection camera having a field of view, for capturing images of a pipe interior. When performing these methods, the crawler apparatus is inserted into a crossover pipe and is maneuvered along an interior circumferential wall of the crossover pipe by selectively steering the front and rear Mechanum wheels. Images of the crossover pipe interior are selectively captured with the camera.

The respective features of embodiments of the invention may be applied jointly or severally in any combination or sub-combination by those skilled in the art.

BRIEF DESCRIPTION OF THE DRAWINGS

The teachings of embodiments of the invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will realize that the teachings of the described exemplary embodiments of invention can be readily utilized in steam turbine engine cross over pipe or other pipe internal inspection. The inspection is performed with a selectively steerable pipe inspection crawler apparatus with a chassis having a longitudinal axis, with front and rear Mechanum wheels capable of independently-selected forward or rearward driven rotational direction, for selectively steering the apparatus within the pipe interior under control of a human-machine interface (HMI). The crawler apparatus has at least one inspection camera having a field of view, for capturing images of a pipe interior that is also under control of the HMI. Embodiments of the crawler apparatus include a selectively orientable inspection camera and/or a deployable bore scope that is selectively deployed and retracted from a descending section of the cross over pipe.

Figure 1:
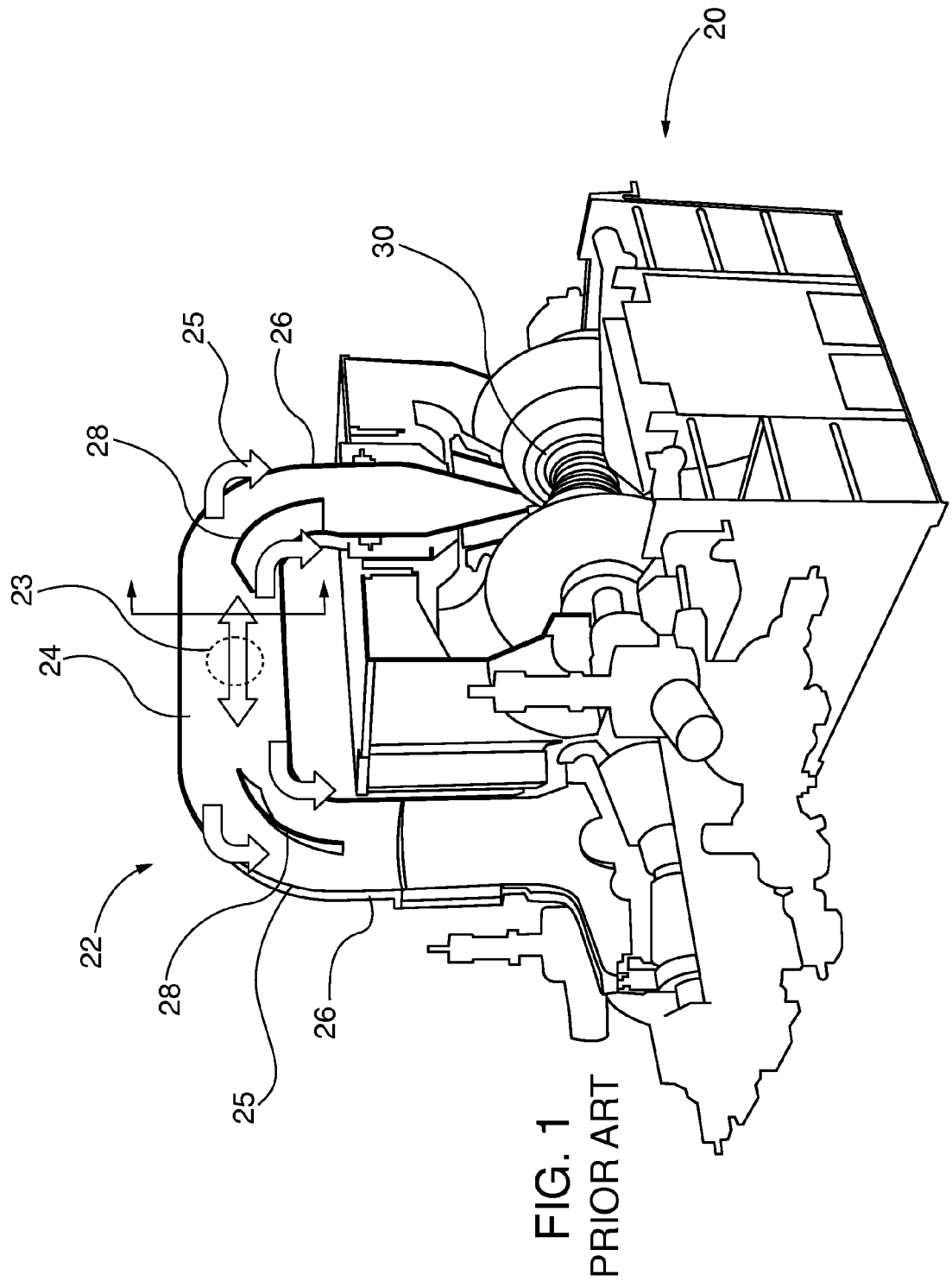
FIG. 1 is a perspective view of a known steam turbine engine and cross over pipe.
Figure 2:
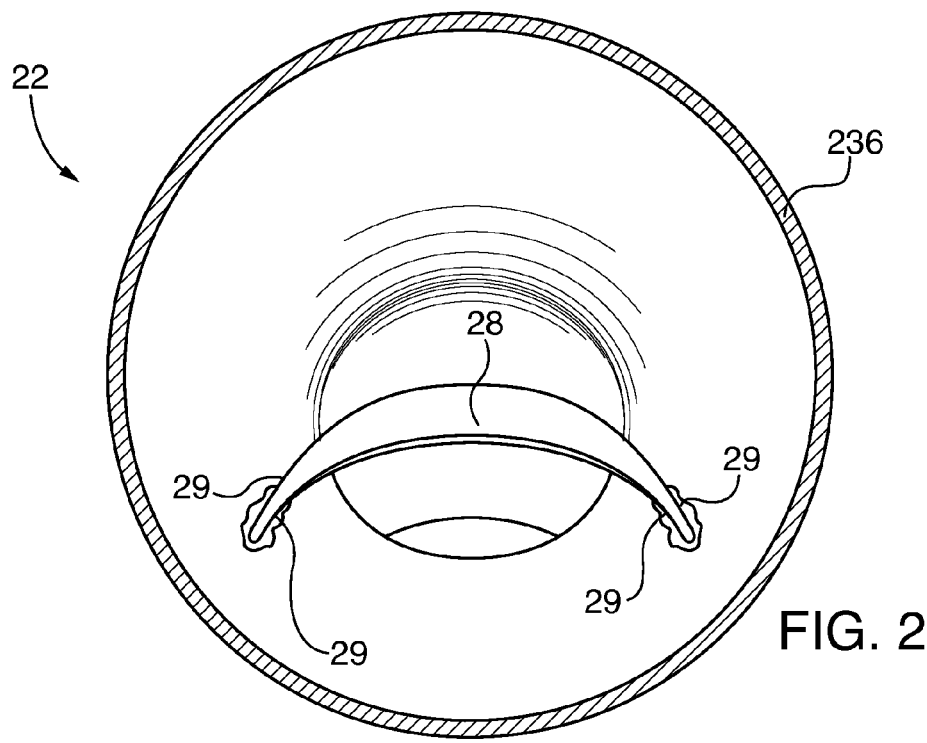
FIG. 2 is a radial cross sectional view of the steam turbine engine cross over pipe of FIG. 1, showing a flow guide and fillet welds that affix the flow guide to the pipe interior.
Figure 3:
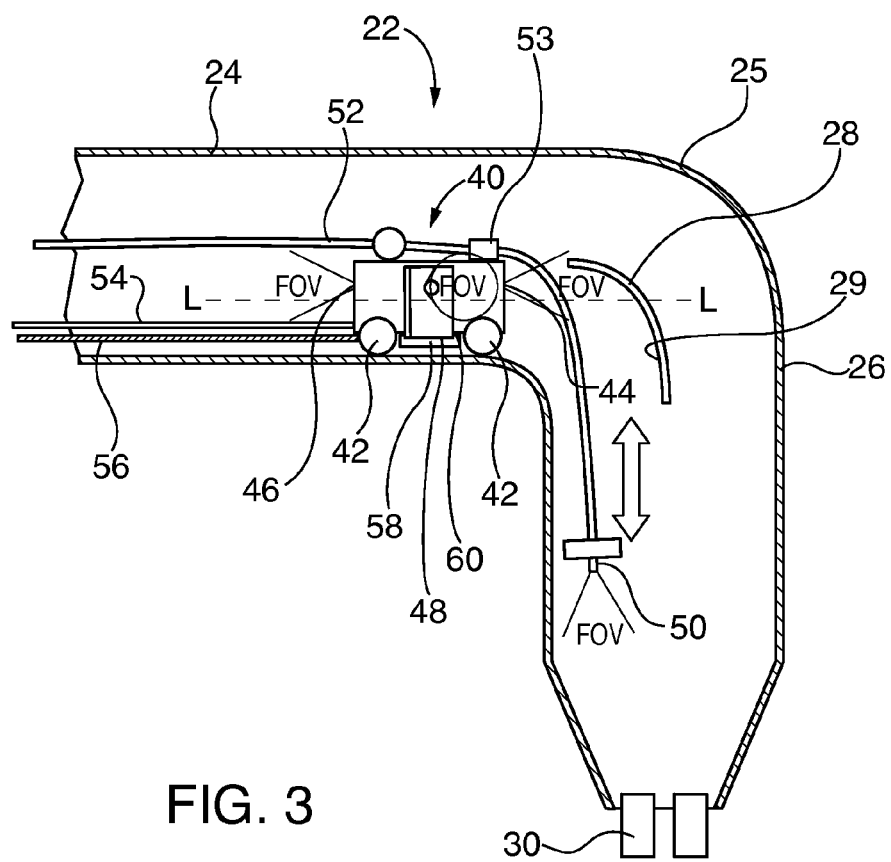
FIG. 3 is a schematic axial cross sectional view of a steam turbine engine cross over pipe being inspected by an embodiment of a steerable pipe inspection crawler apparatus of the invention.

FIG. 3 shows inspection of a steam turbine engine cross over pipe 22 transverse section 24 and descending section 26 by a pipe inspection crawler apparatus 40 constructed in accordance with an exemplary embodiment of the invention. The inspection crawler 40 is maneuvered by independently driven front and rear Mechanum wheels 42, with the assistance of forward camera 44 and rear camera 46, under flow guide 28 to the dropping bend 25 of the descending section 26 transition from the transverse section 24. The crawler apparatus 40 is also capable of steering and climbing up the circumferential sides of the pipe 22 onto the top surface of the flow guide 28, in order to inspect upper sides of the weld fillets 29. Inspection camera unit 48 tilts about an axis parallel to the crawler 40 longitudinal axis L, and includes a motorized focus camera. The crawler 40 has deployed a borescope 50, including an internal camera, down the descending section 26, where it can also capture images of the turbine blades 30. The respective cameras 44, 46 48 and borescope 50 camera all have fields of view (FOV) whose images are captured for pipe 22 inspection. The bore scope 50 is coupled to bore scope cable 52 that passes out of the inlet port 23 of FIG. 2, along with communications cable 54 and retraction cable 56. The bore scope cable 52 is deployed and retracted by bore scope deployment unit 53. The communications cable 54 couples the crawler 40 to a remote human-machine interface (HMI) 94. The retraction cable 56 is used to retract the crawler 40 from the pipe 22 interior in case of drive system malfunction or power loss. One or more magnets 58 are oriented on the underside of the crawler apparatus chassis 60 to generate an attractive force with the pipe 22. The magnetic attractive force helps Mechanum wheels 42 gain additional traction and counteracts gravitational forces for steering the crawler apparatus 40 up the circumferential sides of the pipe 22.

Figure 4:
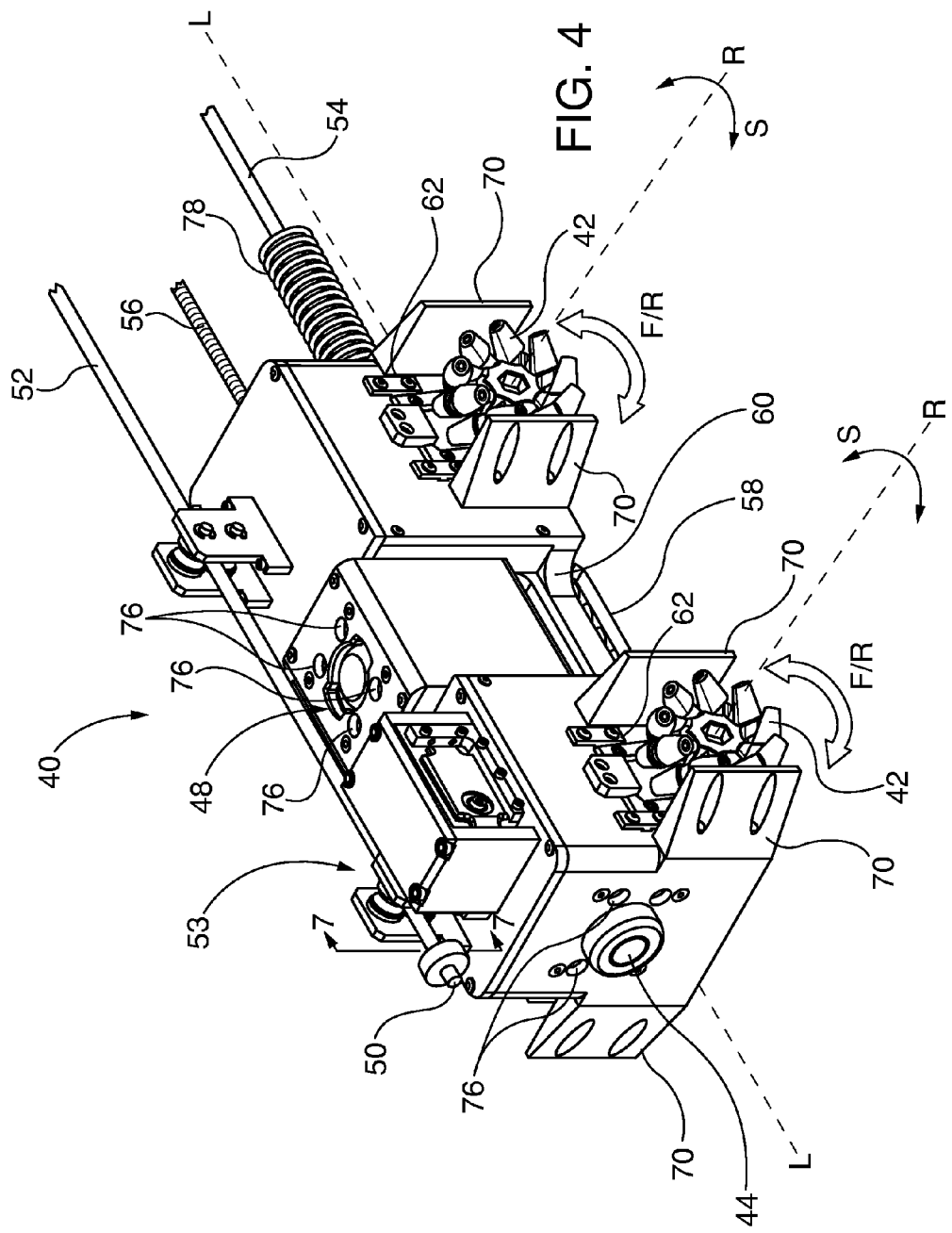
FIG. 4 is a front top perspective view of an embodiment of a steerable pipe inspection crawler apparatus of the invention.
Figure 5:
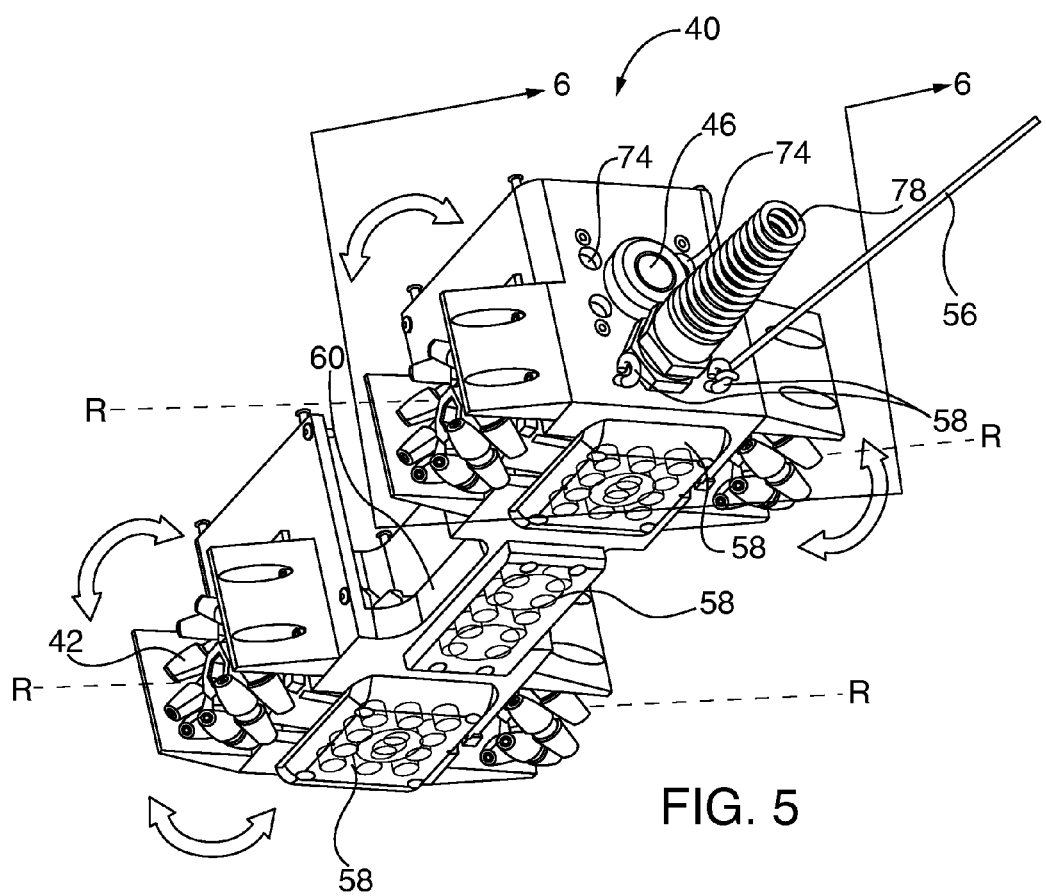
FIG. 5 is a bottom rear perspective view the steerable pipe inspection crawler apparatus embodiment of FIG. 4.
Figure 6:
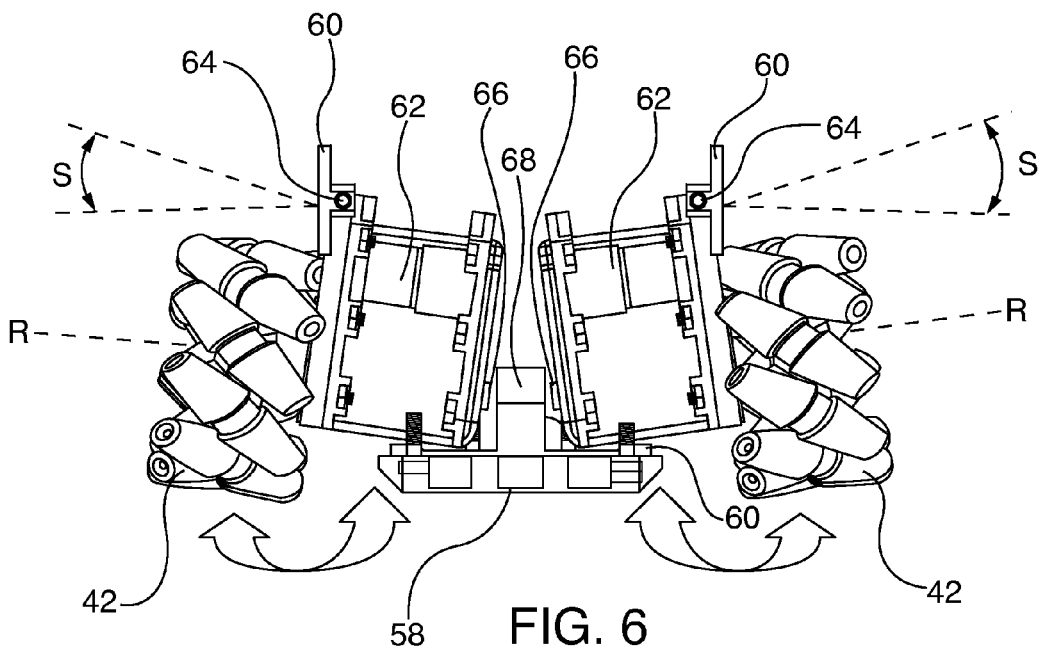
FIG. 6 is a transverse cross sectional view of the steerable pipe inspection crawler apparatus embodiment of FIG. 5 taken along 6-6 thereof.

Components and subsystems of the crawler apparatus 40 are shown in greater detail in FIGS. 3-8. As shown in FIGS. 4 and 5, the crawler apparatus 40 has four Mechanum wheels 42 of known construction, having rotational axes R that are generally perpendicular to the longitudinal axis L. Each wheel 42 is coupled to chassis 60 by a dedicated motorized wheel drive truck 62 that in turn includes a dedicated wheel drive motor. Each wheel truck 62 is coupled to the chassis 60 by a wheel truck pivot 64, which facilitates a pivoting motion by each Mechanum wheel along a swing axis S. As shown in FIG. 6, wheel truck bumpers 66, in cooperation with motor separator/stop 68, prevent the wheels 42 from swinging inward, which is undesirable when attempting to maneuver the inspection apparatus 40. Wheel guards 70 are positioned fore and aft of each Mechanum wheel 42, for protecting the wheels from impact damage.

Embodiments of the crawler apparatus 40 include camera illumination sources that are coupled directly or indirectly to the chassis 60. Light emitting diodes (LEDs) 72, 74 and 76 respectively illuminate the forward camera 44, the rear camera 46 and the inspection camera unit 48. The bore scope 50 preferably includes an internal illumination source, though if desired additional external illumination source can be provided. The rear of the chassis 60 also includes a communication cable 54 strain relief sleeve and one or more eye bolts 80 for coupling to the retraction cable 56.

Figure 7:
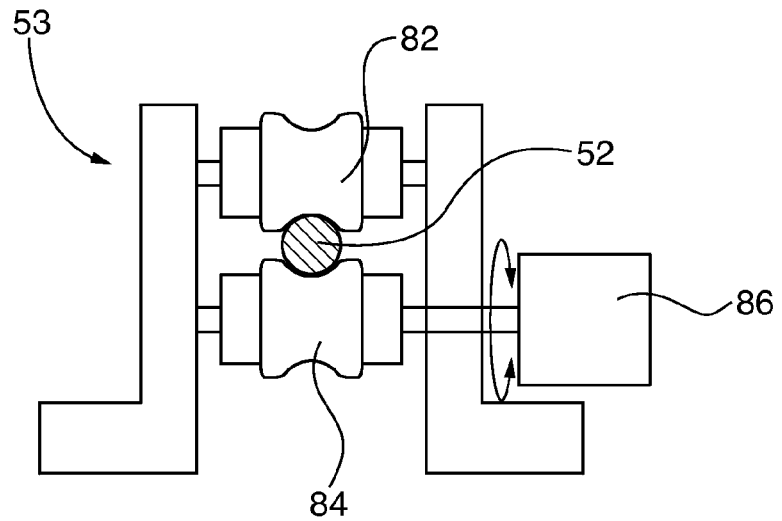
FIG. 7 is a transverse cross sectional view of a bore scope deployment drive mechanism, taken along 7-7 of FIG. 4.

Embodiments of the crawler apparatus 40 bore scope deployment unit 53 include pinch rollers 82 and 84 that are oriented about the circumference of the bore scope cable 52, as shown in FIG. 7. In this embodiment the upper roller 82 is a free-wheeling roller while the lower roller 84 is driven by positioning motor 86. Rotation of the motor 86 in one direction advances or deploys the bore scope 50 while rotation in the opposite direction retracts the bore scope.

Figure 8:
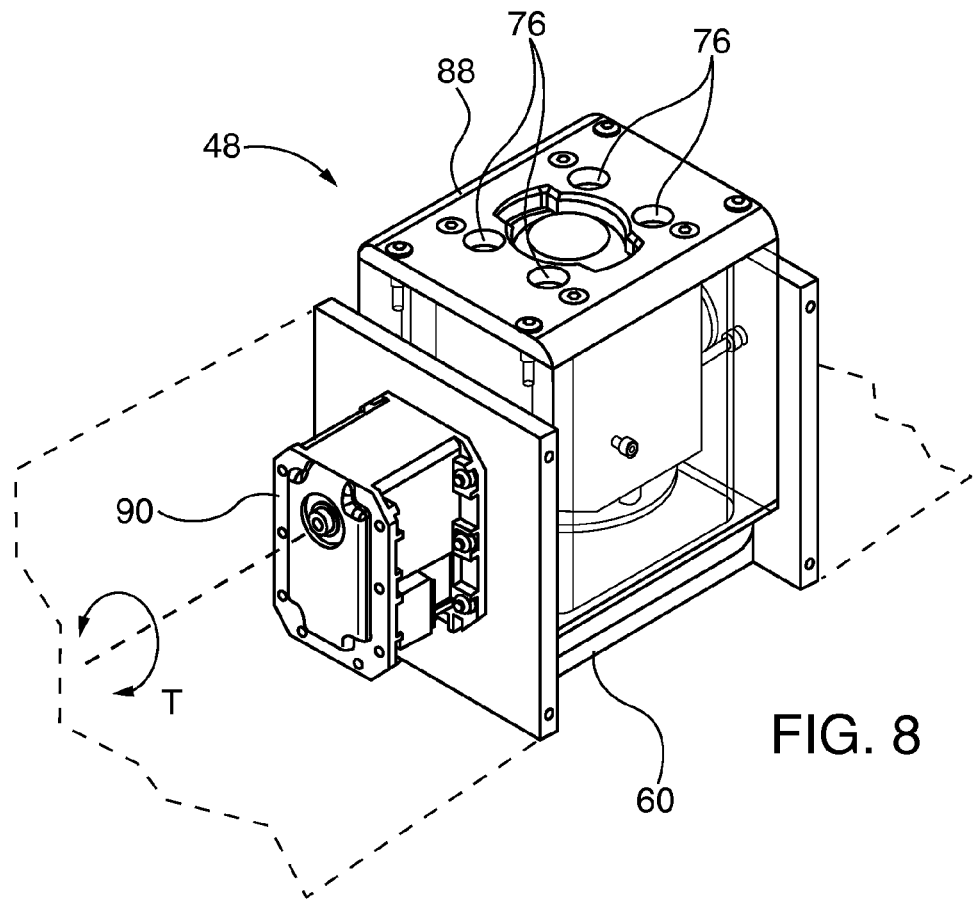
FIG. 8 is a perspective view of an inspection camera unit in accordance with an embodiment of the invention.

In FIG. 8 the inspection camera unit 48 is shown separated from the rest of the inspection crawler apparatus 40. It includes an inspection camera housing 88 that is pivotally coupled to the chassis 60 along a tilt axis T that is generally parallel to the crawler apparatus 40 longitudinal axis L. The camera inspection unit housing 88 is coupled to inspection camera positioning motor 90 that selectively tilts the camera field of view in a desired location of interest within the pipe 22. For example, steering the crawler apparatus 40 up and down the pipe 22 inner circumference, while selectively tilting the inspection camera unit 48 facilitates capture of images of the pipe 22 circumferential wall, upper or lower surfaces of flow guide 28 and the associated fillet welds 29.

Figure 9:
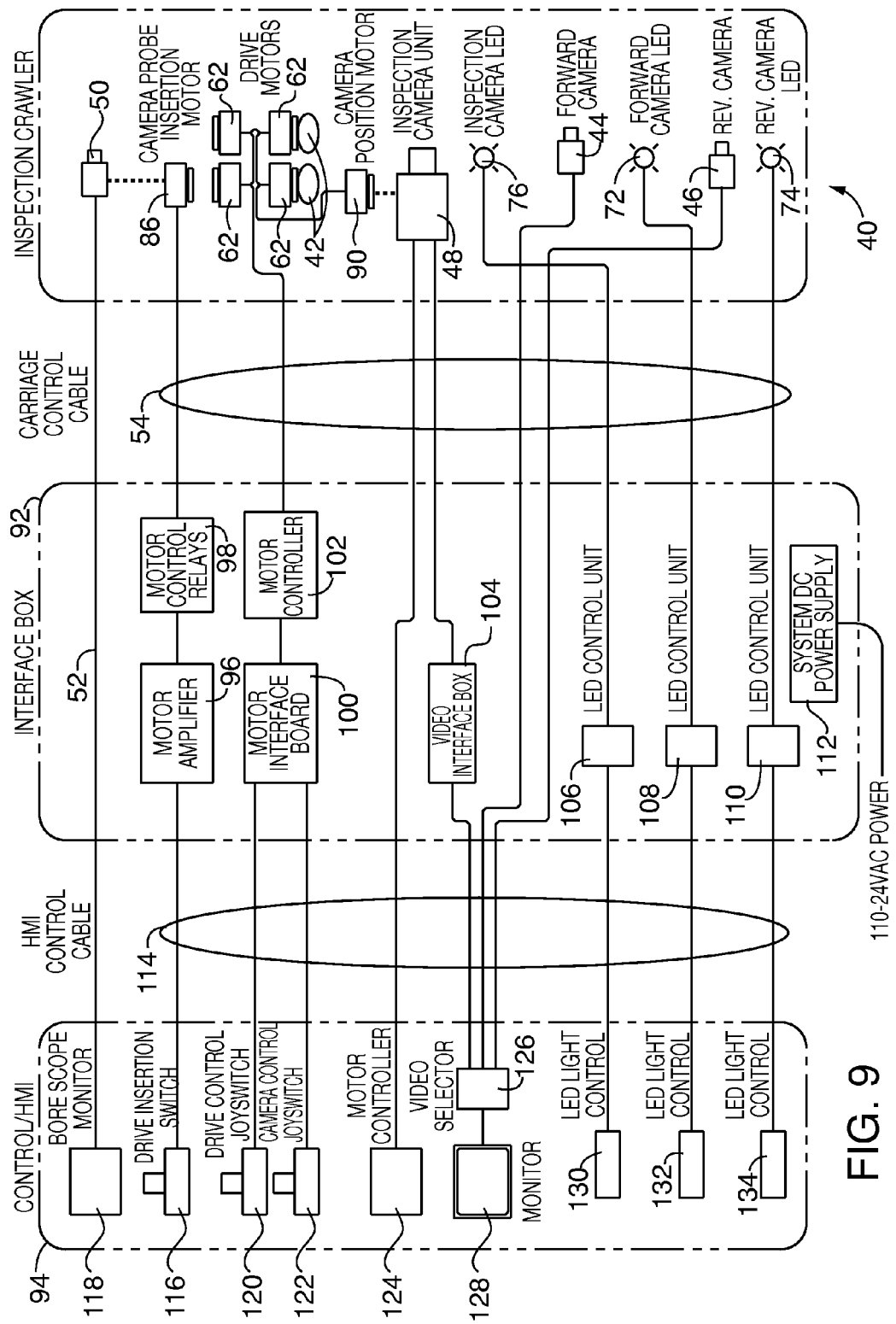
FIG. 9 is a block diagram of a pipe inspection system in accordance with an embodiment of the invention that includes a crawler apparatus and human-machine interface for controlling the controller apparatus.

FIG. 9 is a block diagram of an exemplary embodiment of the pipe interior inspection system of the invention. The system comprises three main sub-systems: inspection crawler 40, interface box 92 and human-machine interface (HMI) 94. Communication cable 54 communicatively couples the inspection crawler 40 to the interface box 92 and HMI cable 114 in turn couples the interface box 92 to the HMI 94. The bore scope 50 is deployed by the bore scope deployment unit position motor 86, which is in turn controlled by camera insertion switch 116, motor amplifier 96 and motor control relays 98. Bore scope 50 captured images are directed by the bore scope cable 52 to bore scope monitor 118.

Mechanum wheels 42 motorized wheel drive trucks 62 and the camera position motor 90 for the inspection camera unit 48 are controlled and powered by motor interface board 100 and motor controller 102. Drive control joy switch 120 is used to steer and maneuver selectively the crawler apparatus 40 within the pipe 22. The drive control joy switch issues forward (FOR)/reverse (REV) wheel rotation and speed commands to the four motorized wheel drive trucks 62. Crawler apparatus maneuvering and steering direction are accomplished by rotating the individual left front (LF), left rear (LR), right front (RF) and right rear (RR) wheels in the following directions:

| DIRECTION | LF | LR | RF | RR |
|---|---|---|---|---|
| forward | FOR | FOR | FOR | FOR |
| reverse | REV | REV | REV | REV |
| left turn | REV | FOR | FOR | REV |
| right turn | FOR | REV | REV | FOR |

Camera control joy switch 122 selectively tilts the inspection camera unit 48 along its tilt axis T and with motor controller 124 controls the camera focus internal motor. The inspection camera unit 48 is coupled to a video interface box 104. Video selector 126 facilitates selective display on video monitor 128 of images captured by the camera inspection unit 48, the forward camera 44 and the rear camera 46. Video selector 126 can be reconfigured in known fashion to feed bore scope 50 images to the video monitor 128 rather than separate bore scope monitor 118. Inspection camera unit LEDs 76 are coupled to LED control unit 106 and LED light control 130 in the HMI 94. Similarly, the forward camera LEDs 72 are coupled to LED control unit 108 and LED light control 132 and the rear camera LEDs 74 are coupled to LED control unit 110 and LED light control 134. Other known HMI controls may be substituted for the camera insertion switch 116 and/or joy switches 120 and 122, such as joysticks, touch pads, ball switches and computer mice.

Although various embodiments that incorporate the teachings of the embodiments of the invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for inspecting an interior of a steam turbine engine cross over pipe of the type having a transverse section, a descending section and a flow guide interposed in a transition between the transverse and descending sections, comprising:
    providing a selectively steerable pipe inspection crawler apparatus, having:
    a chassis having a longitudinal axis;
    at least one front and at least one rear respective Mechanum wheel capable of independently-selected forward or rearward driven rotational direction, for selectively steering the apparatus within a pipe interior; and
    at least one inspection camera having a field of view selectively oriented about a rotation axis generally parallel to the chassis longitudinal axis, for capturing images of a pipe interior;
    inserting the crawler apparatus into a crossover pipe that has a transverse section, a descending section and a flow guide interposed in a transition between the transverse and descending sections, a pipe interior defined by an interior circumferential wall, and fillet welds joining the flow guide to the interior circumferential wall;
    maneuvering the crawler apparatus along the interior circumferential wall of the crossover pipe by selectively steering the front and rear Mechanum wheels; and
    selectively capturing images of the crossover pipe interior, including the interior circumferential wall and the fillet welds joining the flow guide to the interior circumferential wall, with the camera.

2. The method of claim 1, further comprising maneuvering the crawler apparatus along a transverse section of the cross over pipe and into a descending section thereof, capturing images of the flow guide.

3. The method of claim 2, further comprising maneuvering the crawler apparatus under the flow guide.

4. The method of claim 2, further comprising maneuvering the crawler apparatus over the flow guide.

5. The method of claim 1, further comprising:
    providing a selectively deployable bore scope coupled to the chassis;
    maneuvering the crawler apparatus along a transverse section of the cross over pipe and into a descending section thereof;
    deploying the bore scope down the descending section, capturing images therewith; and
    retracting the bore scope from the descending section.

6. The method of claim 1, further comprising coupling a magnet to the chassis, for magnetic coupling of the crawler apparatus to a wall forming the pipe interior when the apparatus is inserted in the cross over pipe, for improving apparatus traction during maneuvering.

7. The method of claim 1, further comprising providing front and rear cameras coupled to the chassis, for at least one of assisting maneuvering the crawler apparatus or for capturing images within the pipe.

8. The method of claim 1, the provided pipe inspection crawler apparatus further comprising:
    pairs of separate left side wheel trucks and separate right side wheel trucks, respectively pivotally coupled independently to the chassis along a pivot axis that is parallel to the chassis longitudinal axis; and
    a Mechanum wheel separately coupled to each respective wheel truck, each wheel freely swinging with its respective wheel truck in an unrestrained motion arc that is perpendicular to the chassis longitudinal axis.

9. A steam turbine engine cross over pipe inspection system, comprising:
    a selectively steerable pipe inspection crawler apparatus, having:

a chassis having a longitudinal axis;

pairs of front and rear independently-selected forward or rearward driven rotational direction Mechanum wheels that are respectively driven by a separate drive motor;

a magnet coupled to the chassis, for magnetic coupling of the apparatus to a wall forming a pipe interior;

at least one inspection camera, having a field of view selectively oriented about a rotation axis generally parallel to the chassis longitudinal axis, and a camera drive motor for selectively orienting the camera field of view, for capturing images of an inner circumference of a cross-over pipe interior;

a human-machine interface, coupled to the crawler apparatus, for controlling the Mechanum wheels and camera drive motors and camera image capture; and front and rear cameras coupled to the chassis and to the human-machine interface, for at least one of assisting maneuvering the crawler apparatus or for capturing images within the pipe with the human-machine interface.

10. The system of claim 9, further comprising:

a selectively deployable bore scope coupled to the chassis, having a bore scope cable captured between pinch rollers and a deployment position motor driving at least one of the rollers that is coupled to the human-machine interface, for selectively deploying or retracting the bore scope with the human-machine interface.

11. The system of claim 9, the pipe inspection crawler apparatus further comprising:

pairs of separate left side wheel trucks and separate right side wheel trucks, respectively pivotally coupled independently to the chassis along a pivot axis that is parallel to the chassis longitudinal axis; and a Mechanum wheel separately coupled to each respective wheel truck, each wheel freely swinging with its respective wheel truck in an unrestrained motion arc that is perpendicular to the chassis longitudinal axis.

* * * * *